United States Patent
Eriksson et al.

(10) Patent No.: US 6,173,875 B1
(45) Date of Patent: Jan. 16, 2001

(54) SHEATH FOR SECATEURS

(75) Inventors: Eckhard Eriksson, Obernau (CH); Staffan Lindberg, Edsbyn (SE)

(73) Assignee: Sandvik AB, Sandviken (SE)

( * ) Notice: Under 35 U.S.C. 154(b), the term of this patent shall be extended for 0 days.

(21) Appl. No.: 09/346,536

(22) Filed: Jul. 2, 1999

(30) Foreign Application Priority Data

Jul. 2, 1998 (SE) .................................................. 9802388

(51) Int. Cl.[7] .................................................. F41C 33/02
(52) U.S. Cl. ........................... 224/677; 224/232; 224/678
(58) Field of Search .................................. 224/678, 195, 224/660, 666, 667, 671, 672, 676, 679, 232, 234, 240, 242, 904, 930, 677; 206/349, 354; 30/194, 151, 152, 231

(56) References Cited

U.S. PATENT DOCUMENTS 3,294,298 * 12/1966 Danielson .............................. 224/677
4,152,831   5/1979 Davies .

FOREIGN PATENT DOCUMENTS

| 0 099 458 | 2/1984 | (EP) . |
| 2 380 008 | 9/1978 | (FR) . |
| 2136341 * | 9/1984 | (GB) .................................... 224/232 |
| 0268793 * | 11/1990 | (JP) .................................... 224/232 |

* cited by examiner

Primary Examiner—Gregory M. Vidovich
Assistant Examiner—Maerena W. Brevard
(74) Attorney, Agent, or Firm—Burns, Doane, Swecker & Mathis, L.L.P.

(57) ABSTRACT

A sheath for secateurs comprises an elongated tray provided at an upper end with a mounting clip and at a lower end with an open rim extending along an outer periphery of the tray and consisting of a bottom rim portion and two vertical portions. The sheath is made from a polymer, and the rim vertical portion are elastically deformable and provided with retaining tongues serving to retain a secateur in the sheath. For easy manufacture of the sheath, the tray is provided with openings disposed behind respective ones of the tongues.

9 Claims, 4 Drawing Sheets

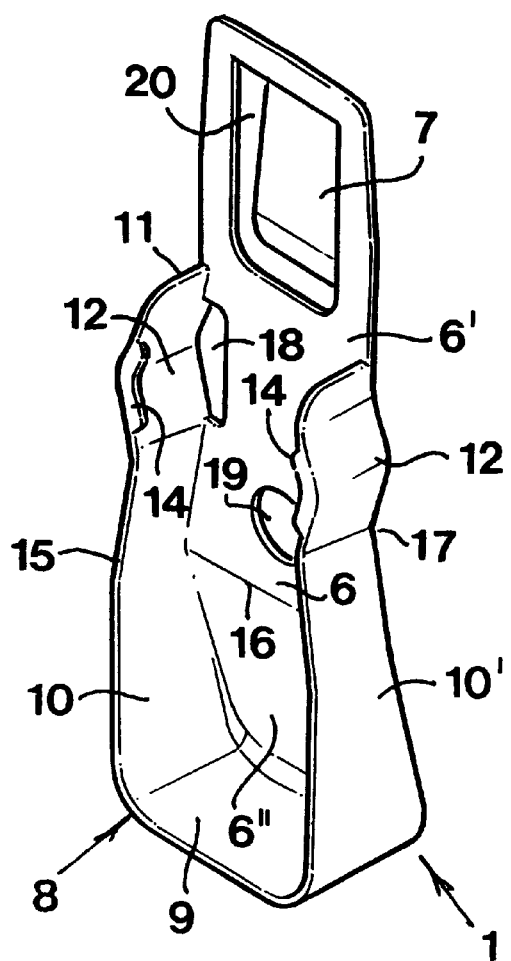
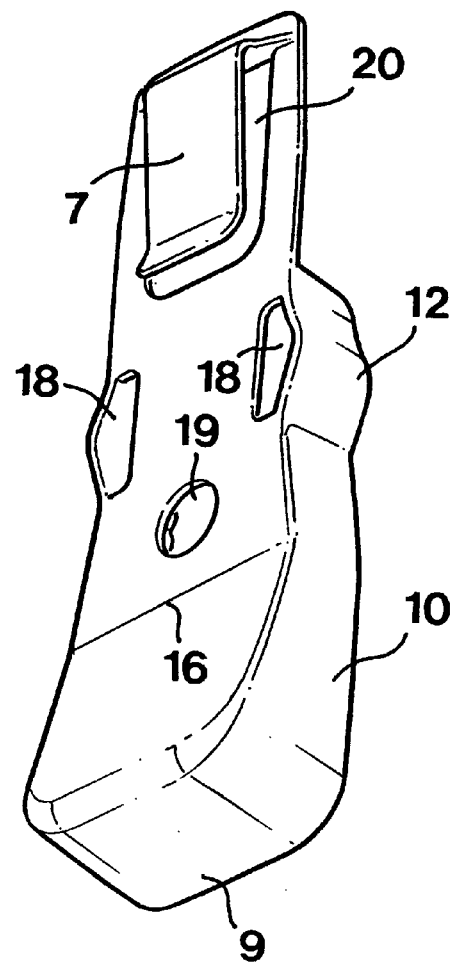
Fig 1
Fig 2

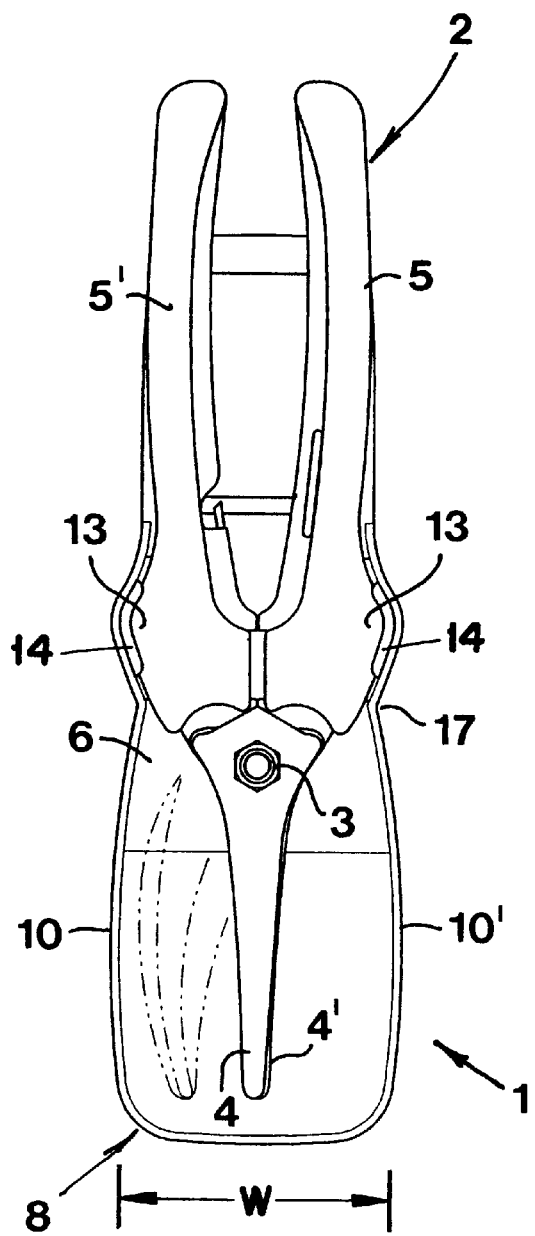
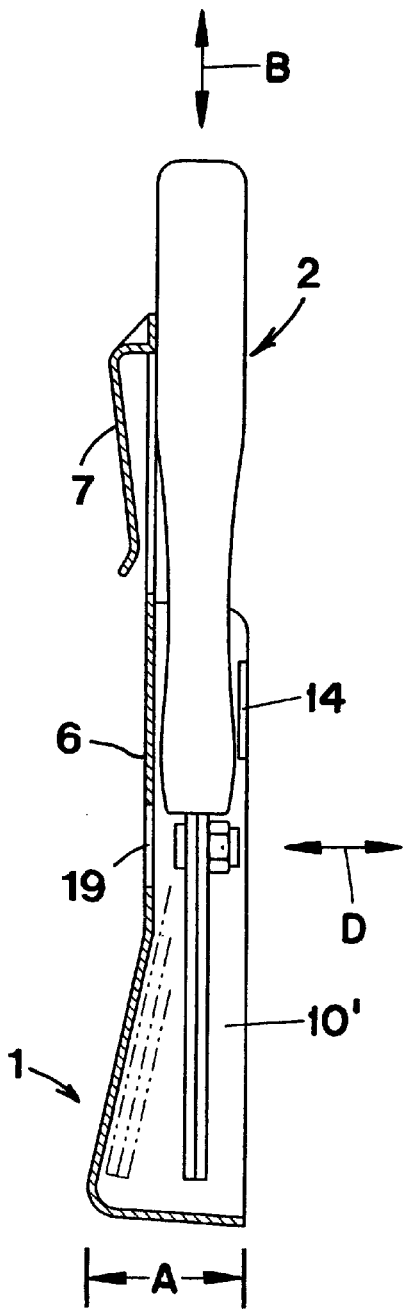
Fig 3
Fig 4

SHEATH FOR SECATEURS

FIELD OF APPLICATION

This invention concerns a sheath made of polymer and adapted to hold secateurs of the type including two shanks, rotatable relative to each other around a joint and having front knife-like blades with edges, and rear ends serving as handles.

BACKGROUND OF THE INVENTION

Secateurs are used not only for non-professional gardening but also professionally, as for harvesting of grapes from vines, for pruning of plants in vineyards, large orchards or similar. Lately, the increasing use for such purposes has led to stringent requirements for secateurs which are frequently used under various circumstances. A gardener or operator in a vineyard or orchard will daily be faced with different tasks and situations. Sometimes the trees, vines, bushes or similar which are to be harvested or pruned will allow an operator to walk along the ground and have access to uncomplicated grape clusters or branch systems. In other cases the operator may be forced to ascend to high or irregularly grown branch systems, perhaps with aid of a ladder, if individual branches are less accessible. Especially during grape harvesting, both hands may be employed for freeing the grape clusters to be picked.

The accessability of the secateur is of great importance for the practical work situation of the operator, especially the possibility to carry and hold the secateur with means other than the hands, and still be able to grip it when needed for the job. One difficulty is that the operator may have to use many more tools during the work, such as saws, toppers, knives or means for bark wound healing. When climbing a tree or a ladder, it may be vital to have both hands free, and not occupied by holding and carrying a secateur which is not used right then. Shortly afterward, the saw must be brought out and held in the hand for a cutting task. This must also be done with little effort and limited motion, since the operator might have a complicated body stance among tree branches, where the space available for arm displacements is limited.

Previously known secateur sheaths have in general been shaped as pockets into which the knife blades of the secateur are inserted, where the handles are located in an accessible position axially extending from the pocket. A common problem for all previously known secateur sheaths is the difficulty of inserting the blades in the sheath, at least in complicated work positions. The retaining force on the secateur is also doubtful, especially as the pocket may be expanded after some period of use of the sheath. Another problem with previously known sheaths is their relatively high production cost. Still another disadvantage is that they usually fit only one secateur model, since the shape of the pocket is strictly adapted to the shape of the blades of the secateur.

PURPOSE AND FEATURES OF THE INVENTION

The present invention aims at overcoming the disadvantages mentioned for previously known secateur sheaths and to create an improved sheath. One basic purpose of the invention is thus to create a sheath where the secateur is easily accessible and which at the same time ensures reliable retaining of the secateur. A further purpose is to create a sheath which can receive secateurs with various blade shapes. It is also an aim to create a sheath which has a simple design and a low production cost.

According to the invention, at least the basic purpose is achieved by a sheath for holding a secateur. The sheath comprises a tray formed of a polymer and having a supporting portion adapted to be supported on a user, and a secateur-receiving portion disposed below the supporting portion. The sheath further includes a rim formed of a polymer and extending around an outer periphery of the secateur-receiving portion to form therewith a pocket. The rim includes two vertically extending portions terminating at upper sections thereof in free edges situated adjacent the supporting portions. The upper sections are elastically flexible toward and away from one another. The upper section includes respective retaining tongues extending toward one another. The tray includes a pair of openings situated behind respective ones of the retaining tongues and having an area greater than an area of a respective retaining tongue.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 1: a perspective view, obliquely from front/above of a sheath according to a first embodiment of the invention.

FIG. 2: a perspective view of the same sheath seen obliquely from behind/below.

FIG. 3: a front view of the sheath with inserted secateur.

FIG. 4: a longitudinal section of the sheath and the inserted secateur as seen from the side.

DETAILED DESCRIPTION OF PREFERRED EMBODIMENTS OF THE INVENTION

Figure 5:
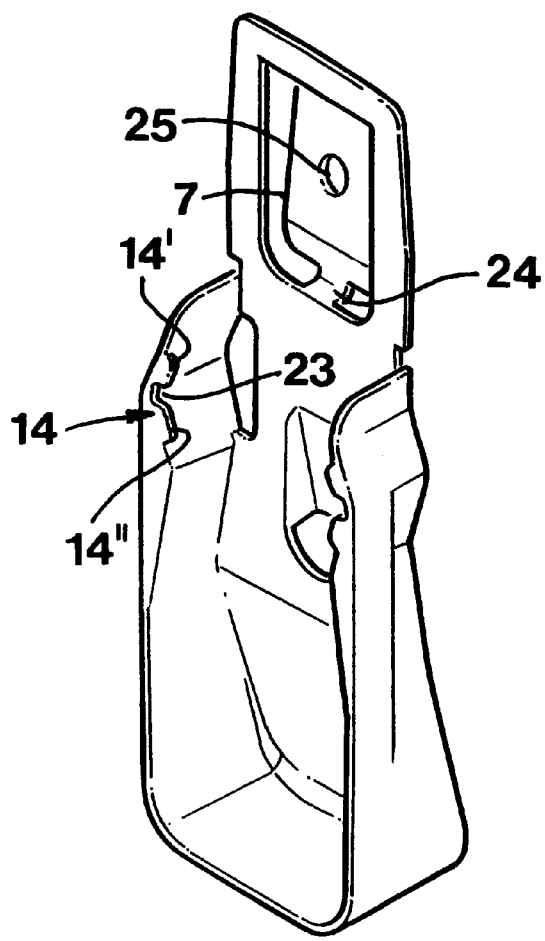
FIGS. 5–8 correspond to FIGS. 1–4 but illustrate a second embodiment of the invention.

A sheath (1) shown in FIGS. 1 and 2 as empty has the purpose of receiving a secateur (2) of conventional type shown in FIGS. 3 and 4. This secateur includes two shanks rotatably connected by a joint (3). The front ends constitute knife-like blades (4,4'), and the rear ends (5,5') are handles. In FIG. 3 the blades (4,4') are shown as relatively long and narrow. However, the blades may have very different shapes. Interrupted lines show how the blades can also be wider or at least partly curved (FIG. 3). FIG. 4 indicates how both blades may be bent out of the plane of the handles. The shape of the blades may be straight or curved.

As shown in FIGS. 1 and 2 the sheath according to the invention comprises a basically oblong tray (6) which at its upper end is provided with a clip (7) for attaching the sheath to a piece of apparel, especially a belt. Along the periphery of the tray is a continuous rim (8) for forming a pocket. The tray (6) forms a rear side of the pocket, the pocket being open at a front side thereof disposed opposite the tray. This rim consists of a bottom portion (9), and two longitudinal or vertical portions (10,10'), the free upper edges (11) of which being located below the clip (7). Both longitudinal rims are provided with V-shaped outward folds (12) which serve as supports for protrusions (13) of the handles of the secateur, see FIG. 3. The V-shaped folds include apexes extending away from one another to define a widened region of the pocket. In the region of the folds (12) there are provided retaining tongues (14) extending towards each other from front edges (15) of the longitudinal portions (10, 10').

According to the invention, the sheath is made from a polymer, preferably polypropen or polyoxymethylen. These polymers have such properties that the continuous rim (8) and the tray (6) form a rigid unit, while at the same time allowing some elastic deformation in the vicinity of the free upper edges (11) of the rim longitudinal portions. Thus, the edges in the region of the V-shaped folds (12) will be initially forced apart and then spring back when a secateur is inserted or removed in the direction of arrow D or arrow B (see FIG. 4). The front edges (15) have in this region such an elasticity that the retaining tongues (14) can move so far apart that the protrusions (13) will pass between them.

The tray (6) is divided into an upper portion (6'), basically lying in a plane oriented parallel to the edges (15) of the rim (8), and a lower portion (6") which is slightly angled to the rear relative to the upper portion. The rim longitudinal portions (11) have a greater depth A adjacent to the lower portion (6") than at the border zone (16) between the portions (6', 6"). The rim longitudinal portions (10,10') expand ramp-like from the border zone (16) towards the bottom rim (9). Thus, the depth of the pocket is greater at a lower portion thereof than at an upper portion thereof.

FIG. 3 shows how a width W of the pocket within the rim (8) is widening downwards from a waist region (17), by making the rim longitudinal portions (10, 10') slightly curved. In the flat vertical upper portion (6') of the tray there are openings (18) (see FIGS. 1–2) facing respective ones of the retaining tongues (14). Each opening (18) has a slightly larger area than the projected area of the corresponding tongue (14). These openings will greatly simplify the manufacture of the sheath with the tongues by injection moulding of the polymer.

In the upper portion (6') there is also a central hole (19), for the purpose of receiving part of the joint (3) of the secateur, such as a nut.

It should also be noted that the clip (7) is an integral part of the unitary polymer sheath body (1). The clip is located at the upper part of a basically rectangular opening (20) with a slightly larger area than the clip-forming flap.

Figure 6:
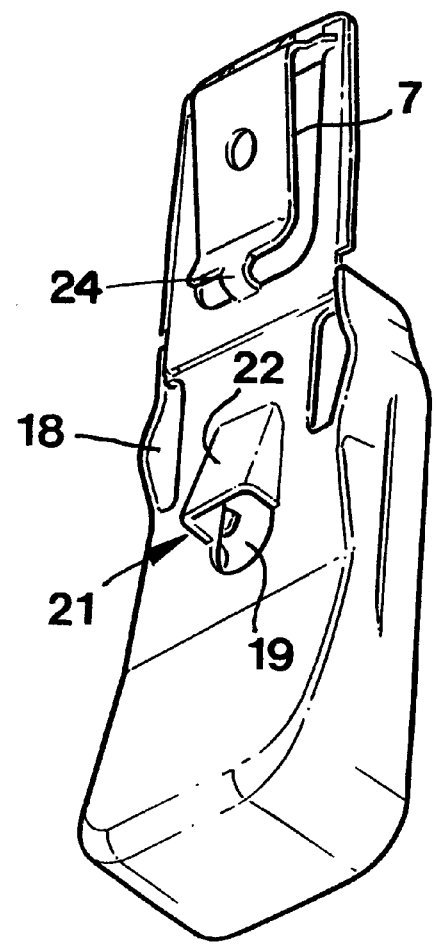
Figure 7:
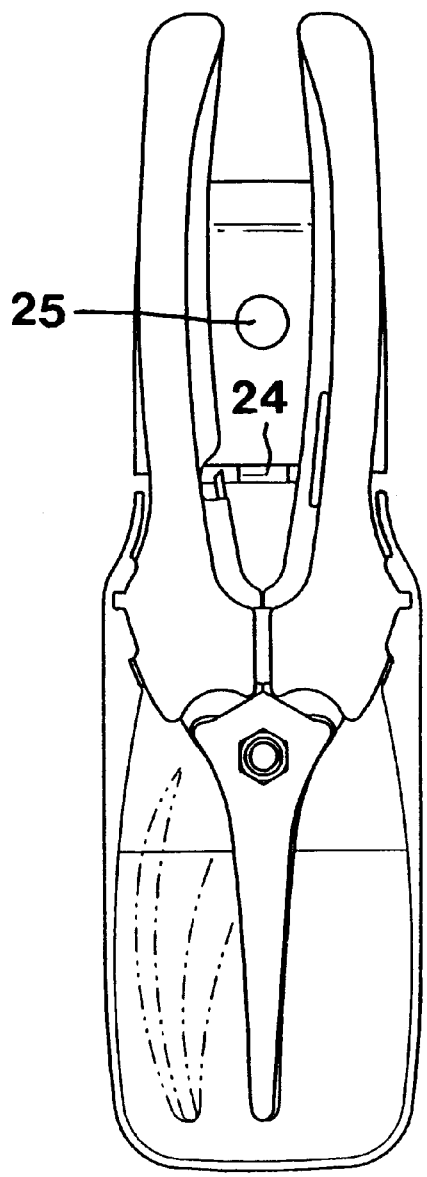
Figure 8:
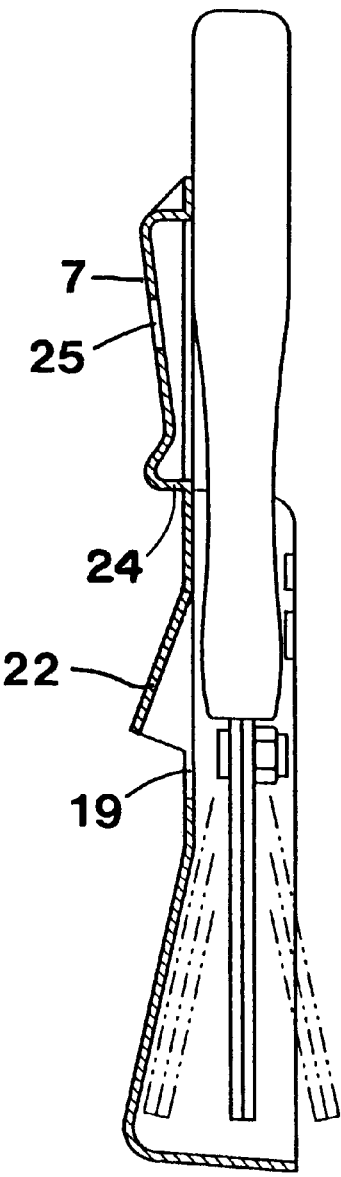

The alternative embodiment shown in FIGS. 5–8 differs from the embodiment in FIGS. 1–4 as follows:

Adjacent to the hole (19) for receiving part of the joint (3) of the secateur is provided an upward narrowing cover (21) with a rear wall (22) extending obliquely downward/ rearward. When the secateur is to be removed from the sheath by pulling upward along the arrow B, this ensures that not even a relatively long rearwardly projecting part of the joint (3) will get stuck in the hole (19). Rather, such a joint part will slide against the inside of the rear wall (22), which has the effect of gradually forcing the secateur out from the tray (6) as the secateur moves upwards.

The size of the tongues (14) is also reduced by cutouts (23) forming two approximately equal size tongue parts (14',14"). The pliability of two tongue parts is greater than for unitary tongues shown in FIGS. 1–4, as is the elasticity of the free upper edges of the rims.

The clip 7 is also modified by originally providing it with a narrow removable connecting bar (24). The user can then choose between using the clip as originally made by threading the belt through it from the side, or by first breaking away the bar (24) to hang the clip from the belt. The clip may also be provided with a hole (25) which allows hanging the sheath with the secateur onto a peg when it is not used.

Function and Advantages of the Invention

A sheath according to the invention is simple to manufacture as well as to utilize. The secateur (2) can be inserted by the simple act of pressing the front protrusions (13) of the handles (5) between the retaining tongues (14) in the direction of arrow D, which tongues will initially spread apart and then spring back because of the flexibility of the longitudinal rims (10,10') adjacent to the V-shaped folds (12). As soon as the handles have moved past the retainer tongues, these will automatically recover their original positions, where they reliably lock the secateur to the sheath. When the secateur is to be removed from the sheath, the operator grips the handles and moves them away from the sheath while pressing the retainer tongues and adjoining portions of the longitudinal rims apart. Alternatively, the secateur could be vertically removed from or inserted into the sheath in the direction of arrow B (see FIG. 4).

Since the sheath has been designed with a pocket that becomes deeper in a downward direction, the sheath will be adapted to receive several types of secateurs. That is, the sheath can be used not only for secateurs having narrow blades of the type shown by continuous lines in FIG. 3, but also for those having wider or sometimes curved blades as shown by broken lines in FIG. 3. The sheath can also be used for secateurs having blades which do not constitute linear extensions of the handles as suggested by broken lines in FIG. 4.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A sheath for holding a secateur comprising:
   a tray formed of a polymer and having a supporting portion adapted to be supported on a user, and a secateur-receiving portion disposed below the supporting portion; and
   a rim formed of a polymer and extending around an outer periphery of the secateur-receiving portion to form therewith a pocket, the rim including two vertically extending portions terminating at upper sections thereof in free edges situated adjacent the supporting portion, the upper sections being elastically flexible toward and away from one another, the upper sections including respective retaining tongues extending toward one another, the tray forming a rear side of the pocket, the pocket being open at a front side thereof disposed opposite the tray, wherein the upper sections include respective generally concave surfaces facing one another to define a widened region of the pocket, the retaining tongues extending along the generally concave regions.

2. The sheath according to claim 1 wherein a depth of the pocket is greater at a lower portion of the pocket than at an upper portion of the pocket.

3. The sheath according to claim 2 wherein a spacing between the vertical portions of the rim increases in a direction toward lower ends of the vertical portions, whereby the pocket width becomes progressively greater in a downward direction.

4. The sheath according to claim 1 wherein a spacing between the vertical portions of the rim increases in a direction toward lower ends of the vertical portions, whereby the pocket width becomes progressively greater in a downward direction.

5. The sheath according to claim 1 wherein the secateur-receiving portion of the tray includes a hole disposed below the openings.

6. The sheath according to claim 5 wherein the tray includes a wall extending at an angle downwardly and rearwardly behind the hole.

7. The sheath according to claim 1, wherein the concave surfaces are V-shaped, with vertexes extending away from one another.

8. The sheet according to claim 1, wherein the tray forms a rear side of the pocket, the pocket being open at a front side thereof disposed opposite the tray.

9. A sheath for holding a secateur comprising:

a tray formed of a polymer and having a supporting portion adapted to be supported on a user, and a secateur-receiving portion disposed below the supporting portion; and a rim formed of a polymer and extending around an outer periphery of the secateur-receiving portion to form therewith a pocket, the rim including two vertically extending portions terminating at upper sections thereof in free edges situated adjacent the supporting portion, the upper sections being elastically flexible toward and away from one another, the upper sections including respective retaining tongues extending toward one another, the tray forming a rear side of the pocket, the pocket being open at a front side thereof disposed opposite the tray, wherein a spacing between the vertical portions of the rim increases in a direction toward lower ends of the vertical portions, whereby the pocket width becomes progressively greater in a downward direction.

* * * * *